US012365074B2

(12) United States Patent
Blair et al.

(10) Patent No.: US 12,365,074 B2
(45) Date of Patent: Jul. 22, 2025

(54) ATTACHMENT FOR POWERED HAMMER

(71) Applicant: MILWAUKEE ELECTRIC TOOL CORPORATION, Brookfield, WI (US)

(72) Inventors: Ian H. A. Blair, Wauwatosa, WI (US); Peter R. Heath, Wauwatosa, WI (US); James E. Pangerc, Pewaukee, WI (US); Joseph D. Greaney, Milwaukee, WI (US); Julian L. Kinneavy, Wauwatosa, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 0 days.

(21) Appl. No.: 18/648,604

(22) Filed: Apr. 29, 2024

(65) Prior Publication Data

US 2024/0278405 A1 Aug. 22, 2024

Related U.S. Application Data

(63) Continuation of application No. 18/132,182, filed on Apr. 7, 2023, now Pat. No. 11,999,038.
(Continued)

(51) Int. Cl.
*B25D 17/00* (2006.01)

(52) U.S. Cl.
CPC ...... *B25D 17/005* (2013.01); *B25D 2250/051* (2013.01); *B25D 2250/331* (2013.01); *B25D 2250/371* (2013.01)

(58) Field of Classification Search
CPC ............ B25D 17/005; B25D 2250/051; B25D 2250/331; B25D 2250/371
See application file for complete search history.

(56) References Cited

U.S. PATENT DOCUMENTS 3,034,588 A * 5/1962 Matheny, Jr. ............ H01R 4/66 173/129
3,216,734 A * 11/1965 Thompson ........... B25D 17/005 15/22.1

(Continued)

FOREIGN PATENT DOCUMENTS

DE 102004019156 A1 * 11/2005 ........... B25D 17/005
JP 2000337392 A * 12/2000

OTHER PUBLICATIONS

Hilti; "Rod Setting Tool TE-S Pd 22 Operating Instruction"; Oct. 31, 2018 (Year: 2018).*

(Continued)

*Primary Examiner* — Thanh K Truong
*Assistant Examiner* — David G Shutty
(74) *Attorney, Agent, or Firm* — Michael Best & Friedrich LLP

(57) ABSTRACT

An attachment includes a body, an impact portion defining an impact axis and configured to receive repeated impacts from the powered hammer, and a driving portion including a side load driving portion and a top load driving portion that alternately receive the rod to transmit driving forces from the repeated impacts to the rod. The side load driving portion defines a side load driving axis that is offset from the impact axis. The top load driving portion includes a blind bore and defines a top load driving axis that is coaxial with the impact axis. The top load driving portion includes a sleeve disposed within the blind bore and configured to decrease wear of the blind bore during use.

15 Claims, 8 Drawing Sheets

Related U.S. Application Data

(60) Provisional application No. 63/328,849, filed on Apr. 8, 2022.

(56) References Cited

U.S. PATENT DOCUMENTS

| | | | | | |
|---|---|---|---|---|---|
| 3,454,113 | A * | 7/1969 | Holtz | E04H 17/263 173/129 |
| 4,776,407 | A * | 10/1988 | Kostylev | E02D 7/20 173/55 |
| 4,825,575 | A * | 5/1989 | Rethke | G09F 15/0062 248/533 |
| 4,992,015 | A * | 2/1991 | Florence | B64D 9/003 410/104 |
| 5,010,710 | A * | 4/1991 | Gray | E04H 17/263 173/90 |
| 5,029,427 | A * | 7/1991 | Jewett | E04H 17/263 52/741.11 |
| 5,598,893 | A * | 2/1997 | Carlson | E04H 17/263 173/217 |
| 9,556,959 | B2 * | 1/2017 | Crawford | F16J 15/3256 |
| 11,084,156 | B1 * | 8/2021 | Jordan | E04H 12/347 |
| 11,214,977 | B2 * | 1/2022 | Martin | E02D 7/00 |
| 11,885,146 | B2 * | 1/2024 | Martin | E04H 17/263 |
| 2011/0283985 | A1 * | 11/2011 | Valerio | B25D 17/02 225/103 |
| 2017/0275895 | A1 * | 9/2017 | Jacober | E04F 15/02038 |
| 2019/0262982 | A1 * | 8/2019 | Ebner | B25D 17/005 |

OTHER PUBLICATIONS

Ebay; “Hilti TE-S PD 22 Rebar Hammer Tool”; website: https://www.ebay.com/itm/115695754165 (Year: 2023).*

Hilti, “TE-S PD, TE-Y PD,” Operating Instructions, 2018 (1 page).

Hilti, “Rod Setting Tool TE-Y Pd 20,” <https://www.hilti.com/c/CLS_POWER_TOOLS_7124/CLS_DEMOLITION_HAMMER_BREAKER_SUB_7124/CLS_ACC_DEMOLITION_HAMMERS_BREAKERS_7124/2223701> web page visited Apr. 10, 2023 (4 pages).

Driveze Corp., “Power Type Ground Rod Driver,” <http://www.drivezecorp.com/powgroundrod.html> web page visited Apr. 10, 2023 (2 pages).

Ebay, “Hilti TE-S PD22 Rebar Hammer Tool,” <https://www.ebay.com/itm/115695754165> web page visited Sep. 29, 2023 (10 pages).

* cited by examiner

ATTACHMENT FOR POWERED HAMMER

CROSS REFERENCE TO RELATED APPLICATIONS

The present application is a continuation of U.S. patent application Ser. No. 18/132,182, filed Apr. 7, 2023, now U.S. Pat. No. 11,999,038, which claims priority to U.S. Provisional Patent Application No. 63/328,849, filed Apr. 8, 2022, the entire contents of all of which are hereby incorporated by reference.

FIELD OF THE INVENTION

The present invention relates to powered hammers, and more particularly to attachments for use with powered hammers.

BACKGROUND OF THE INVENTION

Long metal ground rods are inserted into the ground to electrically ground various circuits. For example, a ground rod may be used near transmission line towers to electrically ground the transmission lines or near residential construction to electrically ground a residential circuit. To install, the rods are typically positioned vertically on the ground, and an operator subsequently applies downward impacts upon a top end of the rod to drive it into the ground.

SUMMARY OF THE INVENTION

The present invention provides, in one aspect, an attachment configured for use with a powered hammer to drive a rod into the ground. The attachment includes a body, an impact portion defining an impact axis and configured to receive repeated impacts from the powered hammer, and a driving portion including a side load driving portion and a top load driving portion that alternately receive the rod to transmit driving forces from the repeated impacts to the rod. The side load driving portion defines a side load driving axis that is offset from the impact axis. The top load driving portion includes a blind bore and defines a top load driving axis that is coaxial with the impact axis. The top load driving portion includes a sleeve disposed within the blind bore and configured to decrease wear of the blind bore during use.

The present invention provides, in another aspect, an attachment configured for use with a powered hammer to drive a rod into the ground. The attachment includes a body formed of a first material, an impact portion defining an impact axis and including a first bore configured to receive a driving shank coupled to the powered hammer, the impact portion configured to receive repeated impacts from the powered hammer, and a driving portion disposed at least partially within the body and including a side load driving portion and a top load driving portion that alternately receive the rod to transmit driving forces from the repeated impacts to the rod. The side load driving portion includes an aperture that is offset from the first bore in a direction perpendicular to the impact axis. The top load driving portion includes a second bore defined by a second material that is different than the first material. The second bore overlaps at least a portion of the first bore in a direction along the impact axis.

The present invention provides, in yet another aspect, an attachment configured for use with a powered hammer to drive a rod into the ground. The attachment includes a body formed of a first material, an impact portion defining an impact axis and including a first bore configured to receive a driving shank coupled to the powered hammer, the impact portion configured to receive repeated impacts from the powered hammer, and a driving portion disposed at least partially within the body and including a side load driving portion and a top load driving portion that alternately receive the rod to transmit driving forced from the repeated impacts to the rod. The side load driving portion includes an aperture that is offset from the first bore in a direction perpendicular to the impact axis. The top load driving portion includes a second bore overlapping at least a portion of the first bore in a direction along the impact axis. The side load driving portion includes a sleeve disposed within the aperture and formed of a second material that is different than the first material.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
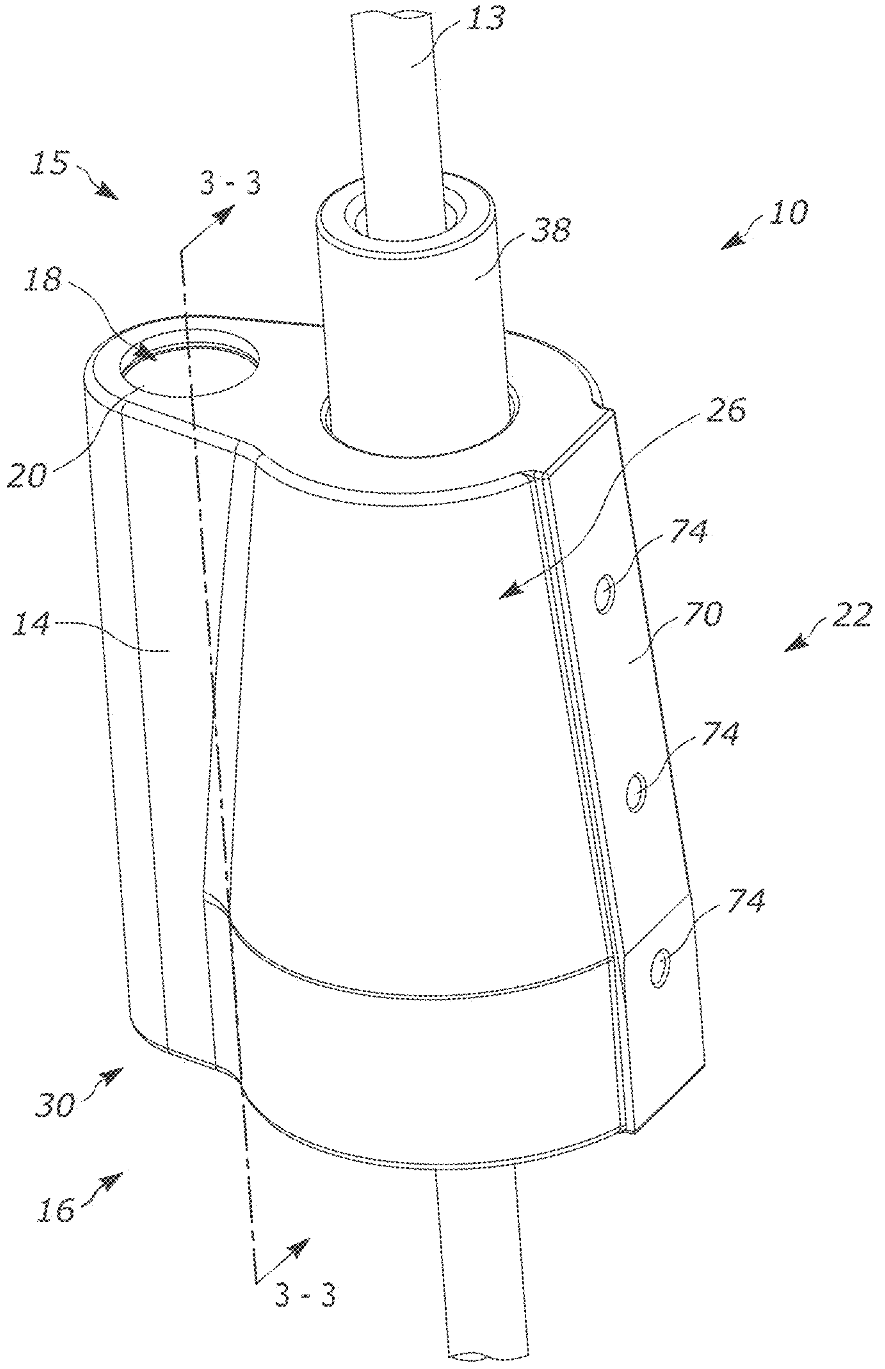
FIG. 1 is a top perspective view of an attachment for use with a powered hammer according to one embodiment of the present disclosure.
Figure 2:
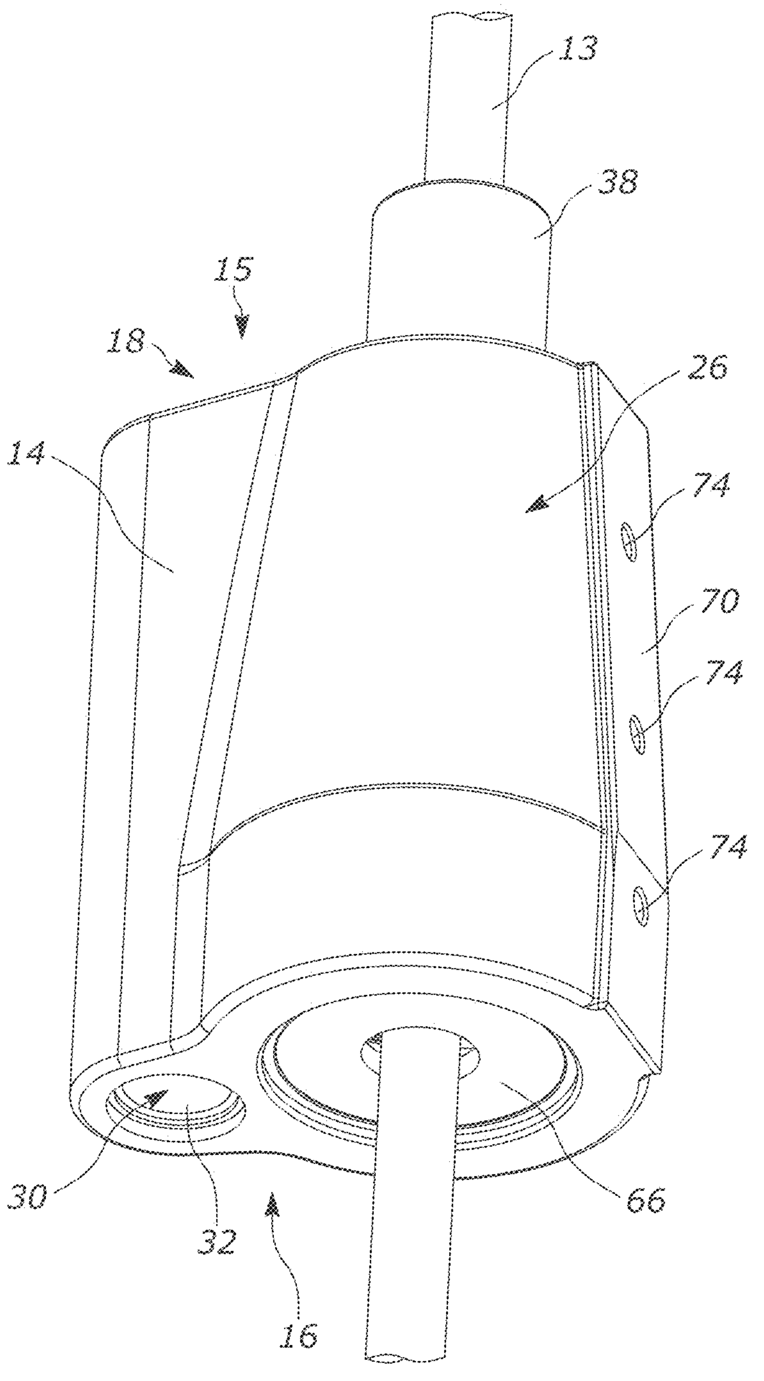
FIG. 2 is a bottom perspective view of the attachment of FIG. 1.

FIGS. 1-4 illustrate an attachment 10 configured for use with a reciprocating power tool (e.g., a powered hammer, not shown) to drive a rod 13 into the ground. The attachment 10 includes a body 14 having a first end 15 and a second end 16 opposite the first end 15. The attachment 10 further includes an impact receiving portion 18 and a driving portion 22 disposed within the body 14. The impact portion 18 is positioned on the first end 15 of the body 14 and receives impacts from the powered hammer, and the driving portion 22 transmits a driving force generated by the impacts to the rod 13 to drive the rod 13 into the ground. More particularly, the illustrated driving portion 22 includes a side load driving portion 26 and a top load driving portion 30 (FIG. 2). The side load driving portion 26 transmits the driving force to sides of the rod 13, while the top load driving portion 30 is positioned on the second end 16 of the body 14 and transmits the driving force to a top end of the rod 13. In operation, the side load driving portion 26 is used to drive the rod 13 into the ground until the rod 13 is nearly driven into the ground. When the rod 13 is nearly driven into the ground, an operator is able to switch to the top load driving portion 30 to complete driving the rod 13 into the ground. The attachment 10 of the present disclosure allows for efficient driving of the rod 13 into the ground, without the operator needing to switch attachments to complete the driving process.

Figure 3:
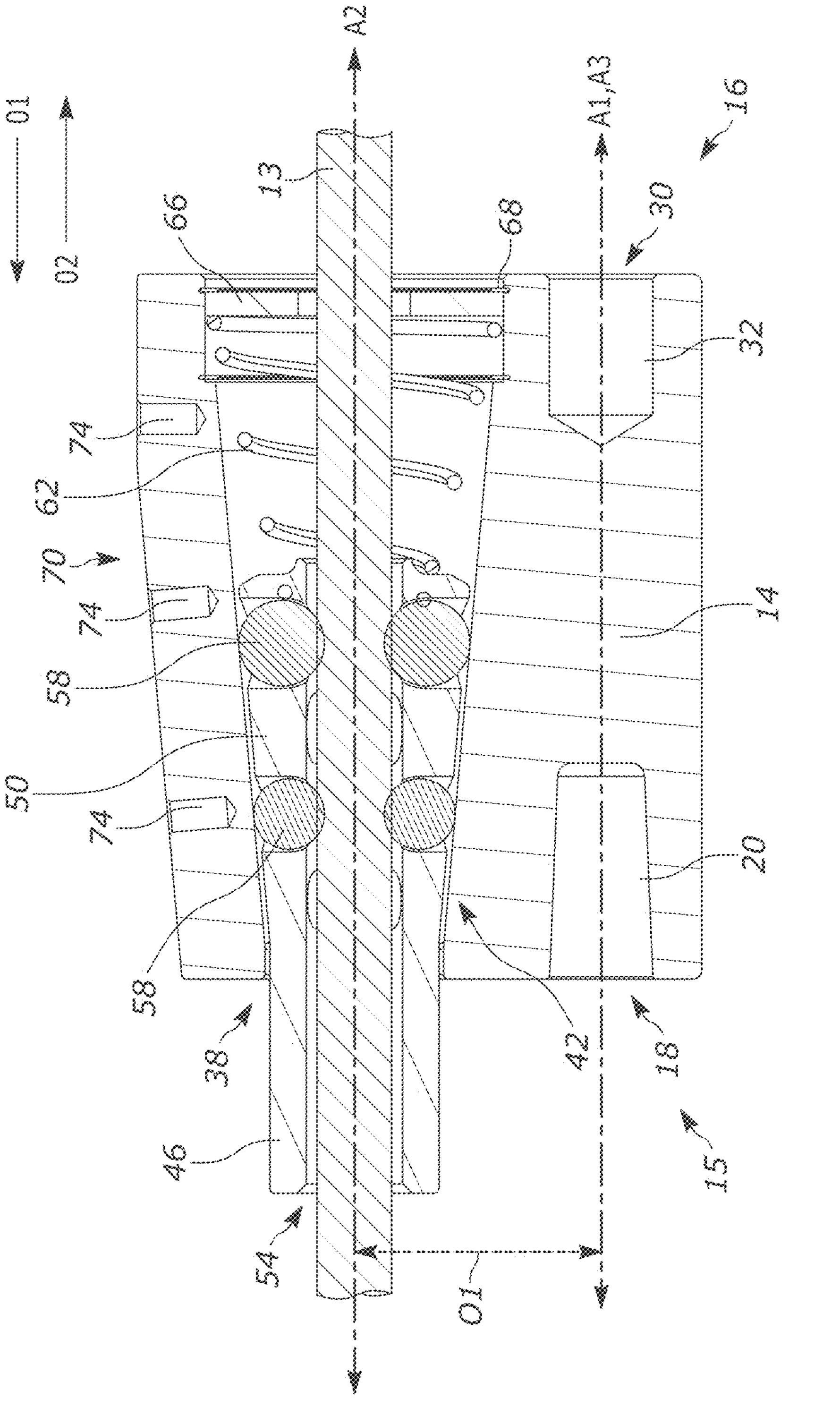
FIG. 3 is a cross-sectional view of the attachment of FIG. 1, taken along section line 3-3 in FIG. 1.

With reference to FIGS. 1 and 3, the impact portion 18 is located on a first side of the body 14. The illustrated impact portion 18 includes a bore 20. More particularly, the bore 20 is a blind bore. A longitudinal axis of the impact portion 18 defines an impact axis A1. The impact portion 18 is shaped to receive a driving shank (not shown) of a powered hammer to couple the attachment 10 to the powered hammer. An interference fit may exist between the driving shank and the impact portion 18 such that impacts from the powered hammer during operation secure the driving shank within the impact portion 18 (e.g., the blind bore 20). In other words, the driving shank is not removable from the impact portion 18 after use. The impact portion 18 may include a sizing feature, such as an insert 34 (FIG. 6), adapted to adjust a diameter of the impact portion 18 to accommodate different size shanks. In some embodiments, the driving shank is coupled to the body 14 via a quick-connect system, rather than an interference fit, so that the driving shank is replaceable. The quick connect system may be similar to a chuck of the powered hammer. In yet other embodiments, the driving shank is a post extending from the body 14 and integrally formed with the body 14. The post is shaped to be received within the chuck of the powered hammer to received repeated impacts therefrom.

With reference to FIG. 3, the side load driving portion 26 includes a one-way collet 38 for selectively securing the rod 13 relative to the body 14 of the attachment 10 and transmitting the driving force from the powered hammer into the rod 13 to drive the rod 13 into the ground. A longitudinal axis of the side load driving portion 26 defines a side load driving axis A2. The side load driving axis A2 is parallel to the impact axis A1. The side load driving axis A2 is also offset from the impact axis A1. The collet 38 allows the attachment 10 to move relative to the rod 13 in a first direction D1 along the side load driving axis A2 and prevents relative motion between the rod 13 and the attachment 10 in a second direction D2 along the driving axis A2. The second direction D2 is the driving direction (e.g., into the ground). In operation, the one-way collet 38 prevents the attachment 10 from moving along the rod 13 towards the ground, thereby facilitating the driving of the rod 13, while allowing the attachment 10 to be moved along the rod 13 away from the ground, thereby allowing the operator to re-position the attachment 10 along the rod 13 as the rod 13 is driven into the ground.

Figure 4:
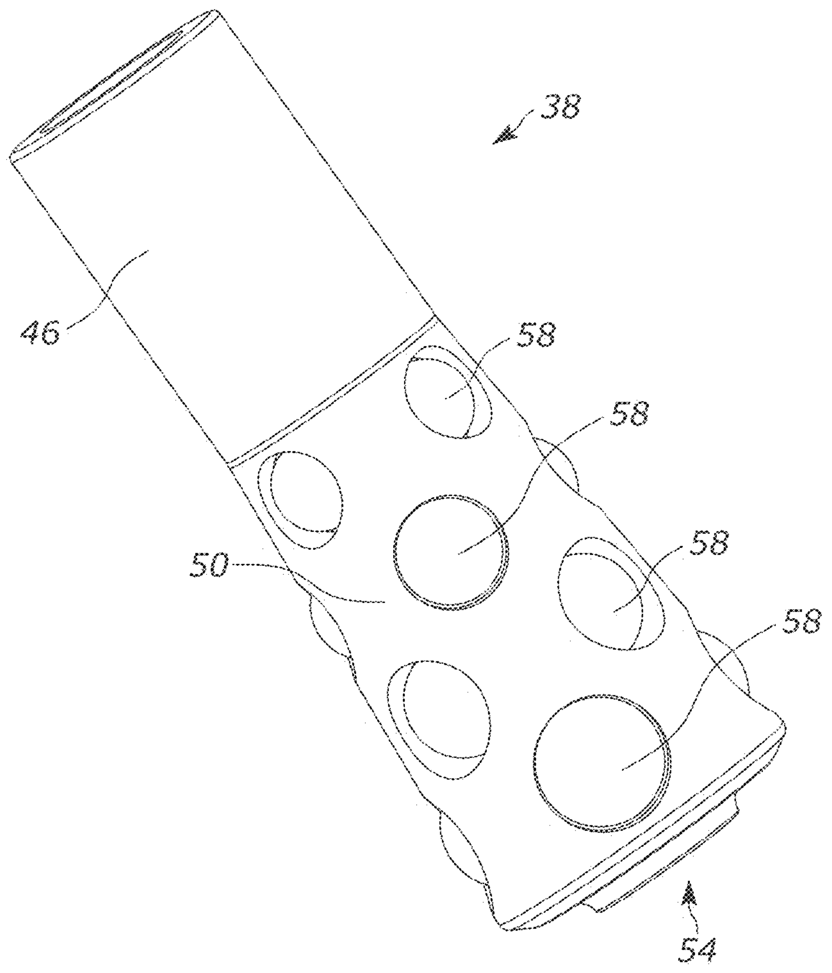
FIG. 4 is a top perspective view of a collet for use with the attachment of FIG. 1.

With continued reference to FIG. 3, the body 14 includes an aperture 42 in which the collet 38 is received. In the illustrated embodiment, the aperture 42 is a frustoconical aperture. The aperture 42 narrows towards a top of the attachment 10 (e.g., proximate the powered hammer). The illustrated collet 38 includes a cylindrical portion 46, a frustoconical portion 50, and a central bore 54 extending a length of the collet 38 and adapted to receive the rod 13 therein. The cylindrical portion 46 is located at a top of the collet 38 and extends beyond the body 14 of the attachment 10 through the narrow portion of the aperture 42. The frustoconical portion 50 is sized and shaped to fit within the frustoconical aperture 42 of the body 14. For example, the frustoconical portion 50 of the collet 38 has a similar slope to the frustoconical aperture 42 of the body 14. The slope of the illustrated embodiment is 5 degrees. In other embodiments, the slope of the collet 38 may be greater than or less than 5 degrees. Spaced circumferentially about the frustoconical portion 50 are a plurality of ball bearings 58. The ball bearings 58 partially extend radially into the central bore 54 to engage the rod 13 and transmit driving forces to the rod 13. The collet 38 of the illustrated embodiment includes four rows of differently sized ball bearings 58 (FIG. 4). Each row of bearings 58 is offset from the rows above and/or below. In the illustrated embodiment, the offset between each row is 45 degrees. Each bearing 58 within a row is of the same nominal size, while bearings 58 in adjacent rows have different nominal sizes. The difference between bearing sizes in adjacent rows corresponds to the slope of the frustoconical portion 50. In other words, as the aperture 42 widens, the bearings 58 increase in size. This allows each bearing 58 to simultaneously engage the rod 13 when the rod 13 is inserted in the collet 38. In other embodiments, the collet 38 may include more or fewer bearings 58 in each row, more or fewer rows of bearings 58, and a greater or smaller offset between rows of bearings 58, depending on the desired size of the attachment 10 and desired diameter of rods 13 to be driven by the attachment 10. However, irrespective of the number or offset, the bearings 58 are sized to correspond to the slope of the frustoconical portion 50 to properly secure the rod 13. Each bearing 58 equally engages the rod 13 to reduce marring during the driving operation. Marring can decrease the grounding capabilities of the rod 13 after it is driven, and therefore should be avoided.

The side load driving portion 26 further includes a biasing member 62 to bias the collet 38 against the aperture 42 and an end cap 66 to secure the collet 38 within the aperture 42. In other words, the biasing member 62 is configured to bias the collet 38 towards the first end 15 of the body 14. The end cap 66 is located below the collet 38, and the biasing member 62 is disposed between the end cap 66 and the collet 38. In one embodiment, the biasing member 62 is a conical compression spring, and the end cap 66 is a washer secured within the aperture 42 by a snap ring 68 (FIG. 3). In another embodiment, the biasing member 62 is a cylindrical compression spring, and the end cap 66 is a cup extending from a bottom of the aperture 42 (FIG. 7) and secured to the aperture 42 via a threaded connection.

The side load driving portion 26 is capable of driving rods of various diameters. For example, the attachment 10 can be used to drive rods 13 of ½", ⅝", or ¾" diameters. In some embodiments, the attachment 10 can be used to drive rods 13 of ⅜" or 1" diameters. The slope of the frustoconical portions 42, 50 dictates the size of rods 13 that can be driven. More particularly, the collet 38 is movable within the aperture 42, against the force of the biasing member 62, to accommodate larger diameter rods. As the collet 38 moves towards the end cap 66, the aperture 42 widens and allows the bearings 58 to move radially outwards to accommodate a larger diameter rod 13, while being able to contact both the body 14 and the rod 13. The use of a conical spring as the biasing member 62 allows for a shorter overall attachment length (e.g., the washer end cap 66 rather than the cup), because the conical spring is compressible to a flatter shape than a cylindrical compression spring. In other words, the use of a cylindrical compression spring requires the cup-shaped end cap to provide clearance for the collet 38 to move within the aperture 42 and accommodate larger diameter rods 13.

Figure 6:
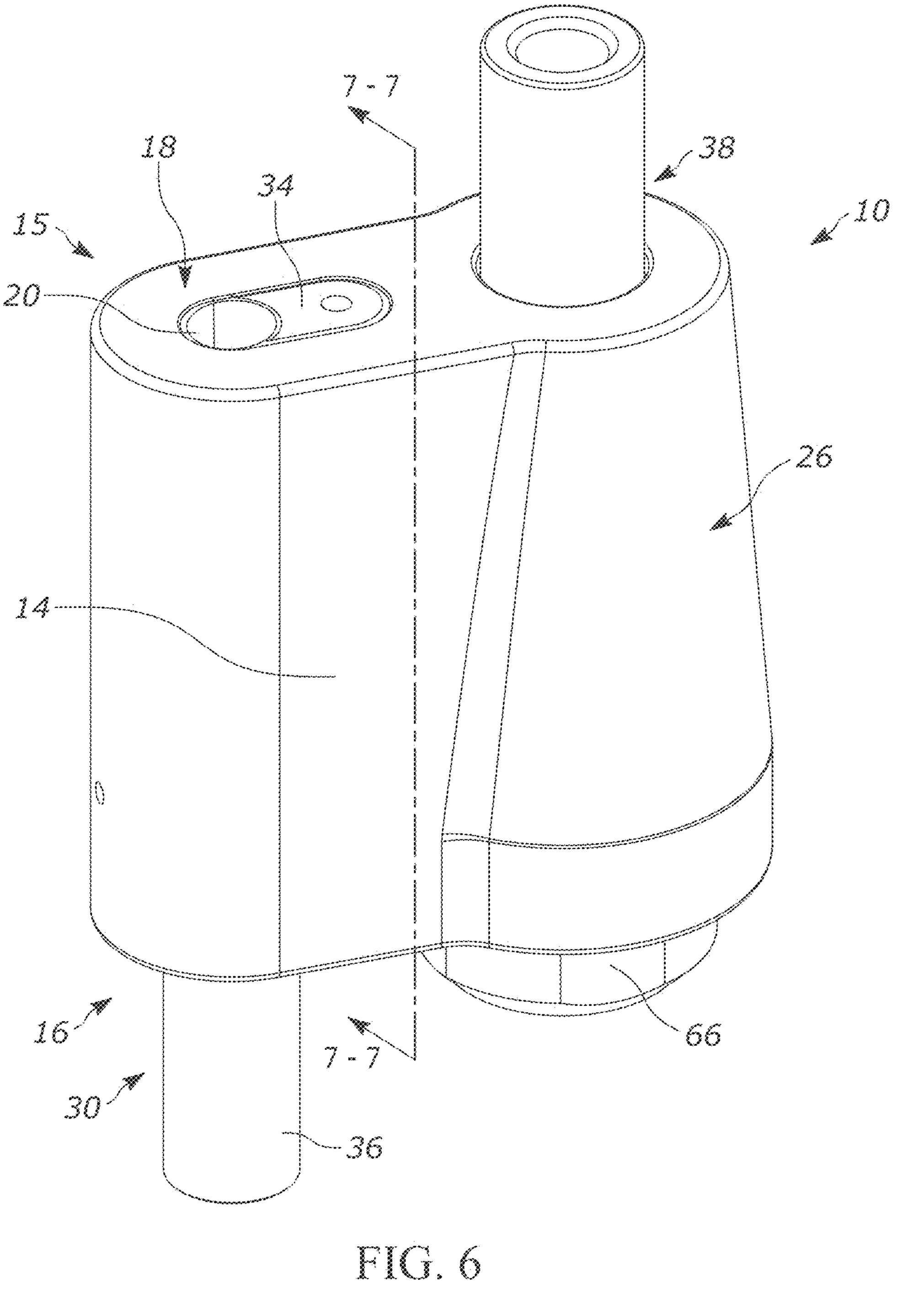
FIG. 6 is top perspective view of an attachment according to yet another embodiment of the present disclosure.
Figure 7:
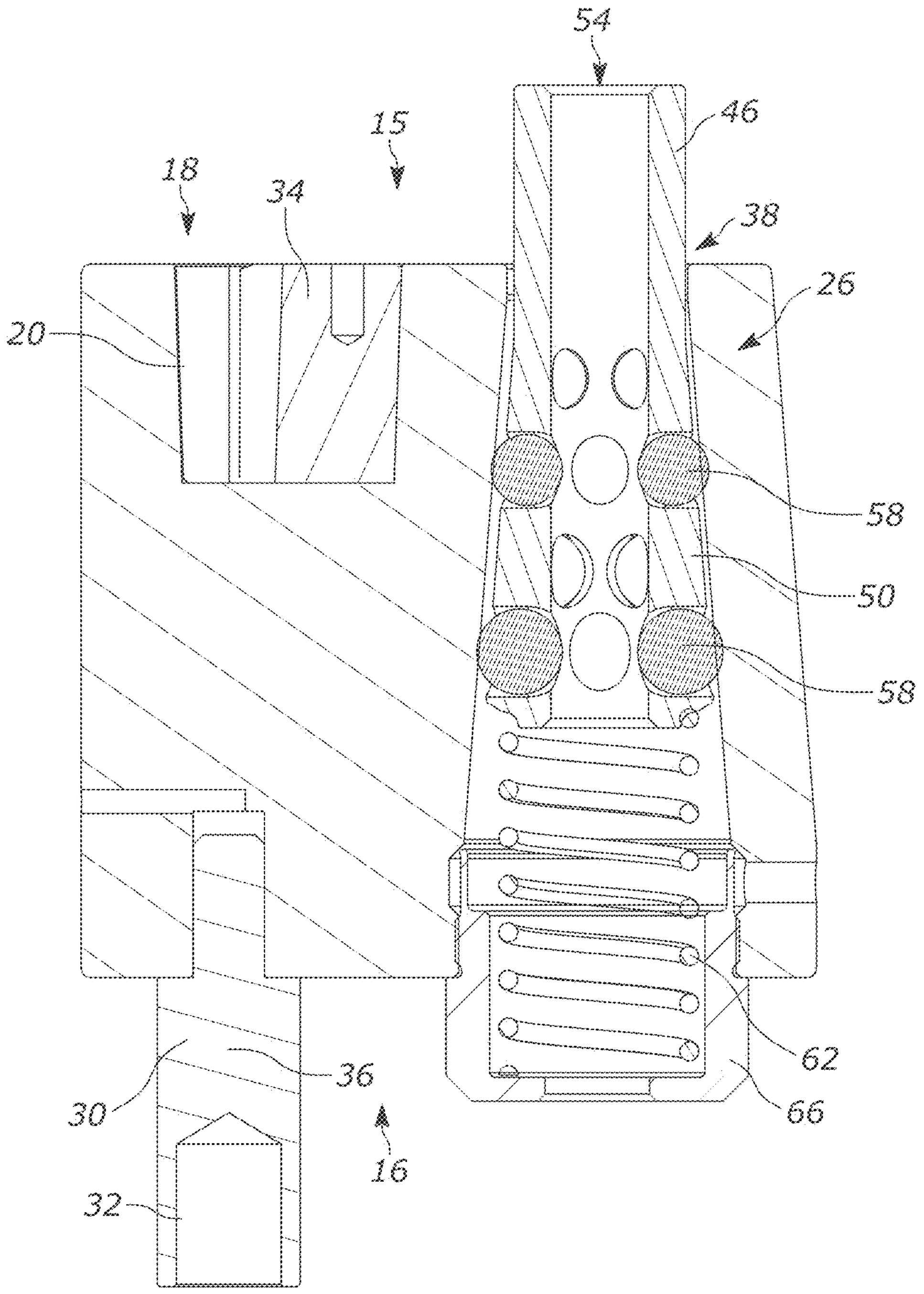
FIG. 7 is a cross-sectional view of the attachment of FIG. 6, taken along section line 7-7 in FIG. 6.

With reference to FIGS. 2 and 3, the top load driving portion 30 is illustrated as a blind bore 32 on a bottom side of the body 14 (e.g., the second end 16 of the body 14). A longitudinal axis A3 of the top load driving portion 30 is parallel to the side load driving axis A2 and to the impact axis A1. In some embodiments, the top load driving axis A3 is co-axial with the impact axis A1. Furthermore, in some embodiments, the top load driving portion 30 may be formed as a post 36 extending below the body 14 and having the blind bore 32 therein (FIGS. 6 and 7). In some embodiments, the impact axis A1 is not parallel to one or both of the side load driving axis A2 and the longitudinal axis A3 of the top load driving portion 30.

Figure 1A:
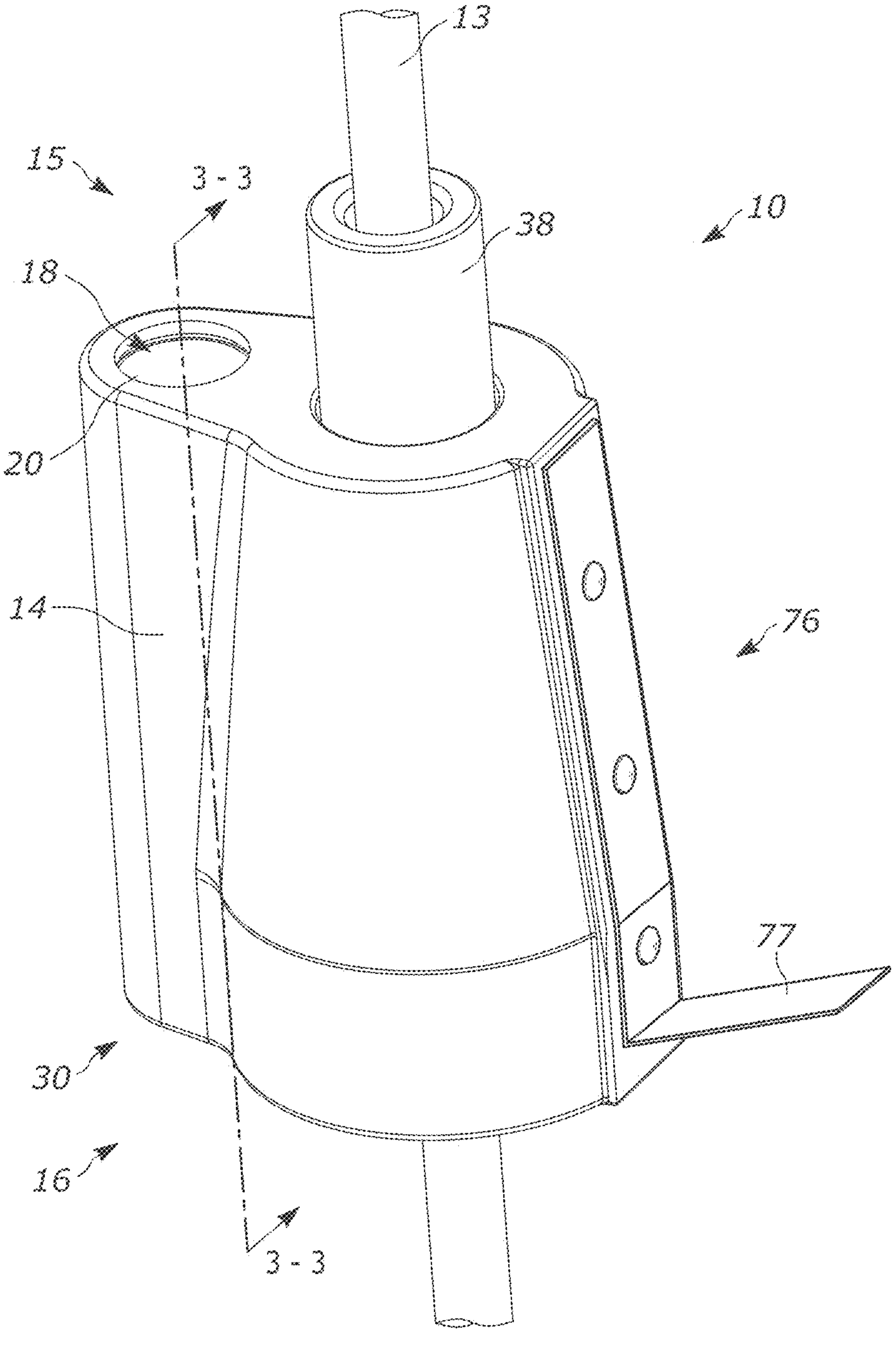
FIG. 1A is a top perspective view of the attachment of FIG. 1, illustrating an accessory coupled to the attachment.

With reference to FIG. 1, in some embodiments, the body 14 includes an accessory receiving portion 70. In the illustrated embodiment, the accessory receiving portion 70 includes a flat plate having fastener receiving holes 74. One such accessory is a step 76 that can be fastened to the attachment 10 via the fastener receiving holes 74 (FIG. 1A). The step 76 may include, for example, a bar 77 or strap extending from a side of the attachment 10. Another such accessory is a handle that can be fastened to the attachment 10 via the fastener receiving holes 74. In operation, the step 76 allows a user to apply a force to the attachment 10, and thus the rod 13, with their foot while driving the rod 13. This force can steady the rod 13 during driving and may also increase the efficiency of the driving by applying a downward force (e.g., in the same direction as the driving force). The step 76 may be foldable, removable, or otherwise configurable to move out of the way when not in use.

The attachment 10 of the present disclosure is optimized for efficient driving of the rod 13. The optimization is in part due to decreasing the overall mass of the attachment 10. Having less mass below the impact point of the powered hammer results in a greater driving force being transmitted to the rod 13. To accomplish this, the overall size of the body 14 is decreased, and the body 14 is formed of lightweight and strong materials such as aluminum or magnesium. For example, compared to a similar attachment made of steel, an attachment made of aluminum may weigh about 65% less, while an attachment made of magnesium may weight about 80% less. In the illustrated embodiment, the impact receiving portion 18 and the driving portion 22 of the body 14 are integrally formed as a single piece. In such embodiments, the impact receiving portion 18 and the driving portion 22 may be formed of the same material. In other embodiments, the impact receiving portion 18 and the driving portion 22 may be separate pieces that are secured (e.g., fastened, welded, etc.) together. In such embodiments, the impact receiving portion 18 and the driving portion 22 may be formed of the same material or may be formed of different materials from each other.

Figure 5:
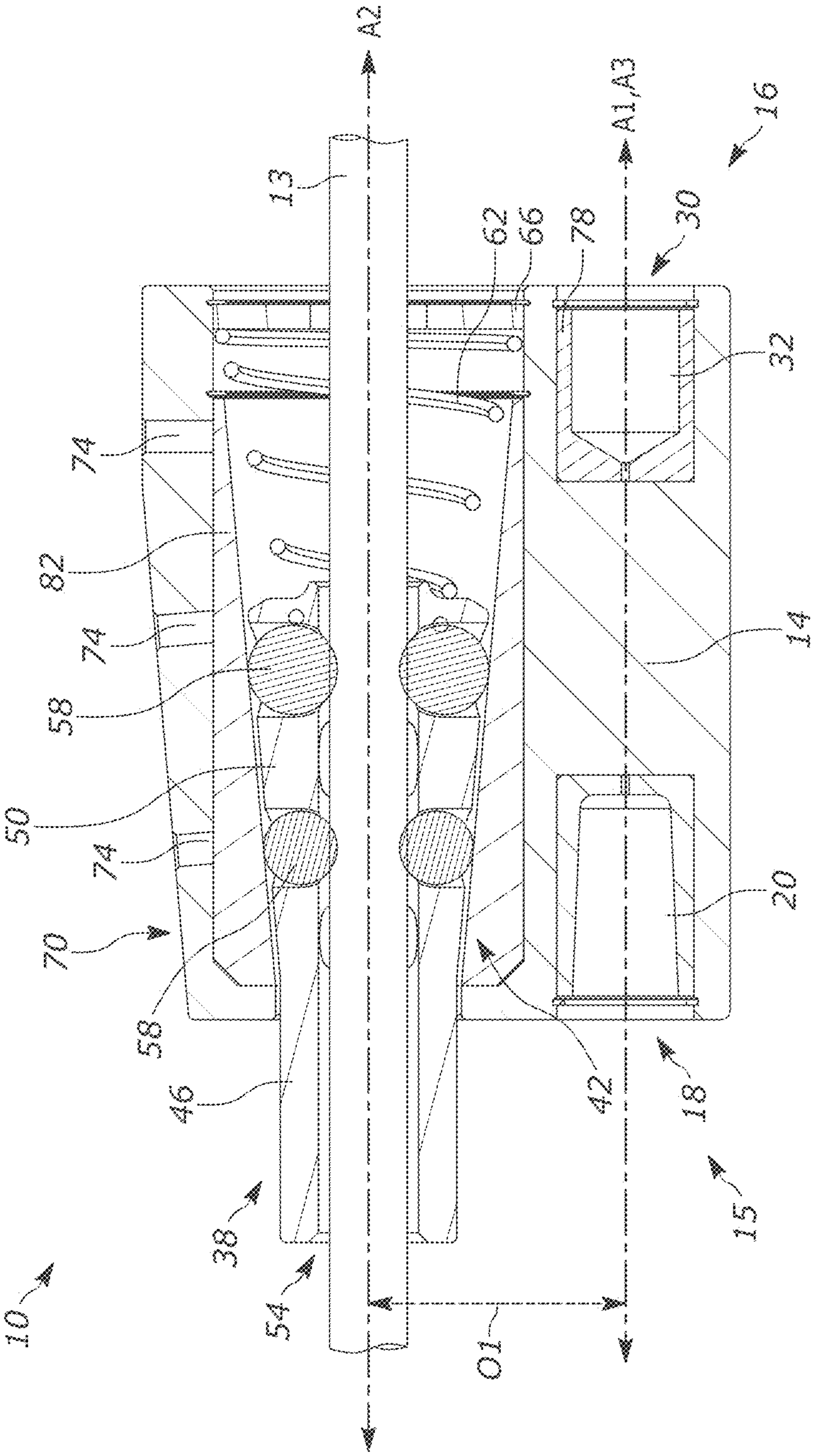
FIG. 5 is a cross-sectional view of an attachment according to another embodiment of the present disclosure.

Referring now to FIG. 5, in some embodiments, hardened steel is included to increase the strength of high wear areas of the body 14. For example, a hardened steel sleeve 78 may be applied to the top load driving portion 30 so that the bore 32 is not overly worn during operation. Similarly, the collet 38 and the end cap 66 can be formed of high strength steel, and a different steel sleeve 82 may be applied to the aperture 42 so that the bearings 58 do not mar the body 14 of the attachment 10 during use. Furthermore, the shape of the side load driving portion 26 increases rod driving efficiency by decreasing an offset distance O1 between the impact axis A1 and the side load driving axis A2. A shorter offset distance O1 between the impact axis A1 and the side load driving axis A2 decreases the bending moment arm applied to the rod during impacts and allows more of the force from the impact to be transferred to the rod 13 to drive the rod 13 linearly into the ground.

To drive a rod 13 with the above-described attachment 10, the operator first couples the attachment 10 to the powered hammer via the impact portion 18. In the illustrated embodiment, the driving shank is inserted into the chuck of the powered hammer. If the attachment 10 has not been used before (e.g., the driving shank is not secured within the impact portion 18), the operator also inserts the driving shank into the blind bore of the impact portion 18. Next, the rod 13 is inserted into the side load driving portion 26 from above the attachment 10. The insertion direction corresponds to the direction D1 in which the collet 38 allows for relative movement of the rod 13 and the attachment 10 (e.g., opposite the driving direction D2). At this point, the rod 13 can be aligned with the ground at a desired location and the operator can actuate the powered hammer to begin driving the rod 13. Optionally, the operator may have secured a step to the attachment 10 to assist in driving the rod 13. As the rod 13 is driven, the operator adjusts the position of the attachment 10 relative to the length of the rod 13 until the rod 13 is nearly driven into the ground. At this point, the operator will release the side load driving portion 26 from the rod 13 and insert a top of the rod 13 into the top load driving portion 30 to complete driving the rod 13 into the ground. While the steps of a driving operation have been described in a particular order above, one or ordinary skill in the art will understand the ability to perform the steps in a different order.

The attachment 10 has been described with respect to driving electrical ground rods 13. However, one of ordinary skill in the art will understand that the attachment 10 can be used for driving other rods and stakes as well.

Although the invention has been described in detail with reference to certain preferred embodiments, variations and modifications exist within the scope and spirit or one or more independent aspects of the invention as described.

Various features and advantages of the disclosure are set forth in the following claims.

What is claimed is:

1. An attachment configured for use with a powered hammer to drive a rod into the ground, the attachment comprising:

a body;

an impact portion defining an impact axis and configured to receive repeated impacts from the powered hammer; and a driving portion including a side load driving portion and a top load driving portion that alternately receive the rod to transmit driving forces from the repeated impacts to the rod, the side load driving portion defining a side load driving axis that is offset from the impact axis, the top load driving portion including a blind bore and defining a top load driving axis that is coaxial with the impact axis, wherein the top load driving portion includes a sleeve disposed within the blind bore and configured to decrease wear of the blind bore during use, wherein the body is formed of a first material, and wherein the sleeve is formed of a second material that is harder than the first material, wherein the side load driving portion includes a one-way collet configured to transmit a driving force generated by the impacts from the powered hammer to a side of the rod, the one-way collet configured to allow the attachment to move relative to the rod in a first direction and to prevent relative movement between the attachment and the rod in a second direction, opposite the first direction, and wherein the one-way collet is formed of a third material that is harder than the first material.

2. The attachment of claim 1, wherein the sleeve is formed of a hardened steel.

3. The attachment of claim 1, wherein the third material is formed of a hardened steel.

4. The attachment of claim 1, wherein the impact portion includes a blind bore configured to receive a portion of a driving shank of the powered hammer therein.

5. An attachment configured for use with a powered hammer to drive a rod into the ground, the attachment comprising:

a body formed of a first material;

an impact portion defining an impact axis, the impact portion including a first bore configured to receive a driving shank coupled to the powered hammer, the impact portion configured to receive repeated impacts from the powered hammer; and a driving portion disposed at least partially within the body and including a side load driving portion and a top load driving portion that alternately receive the rod to transmit driving forces from the repeated impacts to the rod, the side load driving portion including an aperture that is offset from the first bore in a direction perpendicular to the impact axis, the top load driving portion including a second bore defined by a second material that is different than the first material, the second bore overlapping at least a portion of the first bore in a direction along the impact axis.

6. The attachment of claim 5, wherein the first material is aluminum.

7. The attachment of claim 6, wherein the second material is steel.

8. The attachment of claim 5, wherein the top load driving portion is formed as a blind bore extending into the body, and wherein a sleeve formed of the second material is disposed within the blind bore.

9. The attachment of claim 5, wherein the top load driving portion includes a post formed separately from the body and coupled to the body opposite the impact portion.

10. The attachment of claim 5, wherein the side load driving portion defines a side load driving axis that is offset an equal distance from the impact axis and from a top load driving axis that is defined by the top load driving portion.

11. The attachment of claim 10, wherein the top load driving axis is co-axial with the impact axis.

12. An attachment configured for use with a powered hammer to drive a rod into the ground, the attachment comprising:

a body formed of a first material;

an impact portion defining an impact axis, the impact portion including a first bore configured to receive a driving shank coupled to the powered hammer, the impact portion configured to receive repeated impacts from the powered hammer; and a driving portion disposed at least partially within the body and including a side load driving portion and a top load driving portion that alternately receive the rod to transmit driving forces from the repeated impacts to the rod, the side load driving portion including an aperture that is offset from the first bore in a direction perpendicular to the impact axis, the top load driving portion including a second bore overlapping at least a portion of the first bore in a direction along the impact axis, wherein the side load driving portion includes a sleeve disposed within the aperture and formed of a second material that is different than the first material, wherein the sleeve is formed of steel, and wherein the body is formed of a material softer than steel.

13. The attachment of claim 12, wherein the top load driving portion is formed separately from the body and coupled to the body.

14. The attachment of claim 13, wherein a portion of the top load driving portion is received within the body to couple the top load driving portion to the body.

15. The attachment of claim 12, further comprising a second sleeve disposed within the second bore of the top load driving portion, the second sleeve being formed of a third material different than the first material.

* * * * *